United States Patent [19]
Kawakami

[11] Patent Number: 5,701,786
[45] Date of Patent: Dec. 30, 1997

[54] SHIFTING DEVICE FOR A BICYCLE

[75] Inventor: Tatsuya Kawakami, Sakai, Japan

[73] Assignee: Shimano, Inc., Osaka, Japan

[21] Appl. No.: 618,668

[22] Filed: Mar. 19, 1996

Related U.S. Application Data

[63] Continuation of Ser. No. 261,374, Jun. 16, 1994, abandoned.

[30] Foreign Application Priority Data

Jun. 17, 1993 [JP] Japan .................. 5-032619 U

[51] Int. Cl.$^6$ .................. F16C 1/10; G05G 11/00
[52] U.S. Cl. .................. 74/502.2; 74/489
[58] Field of Search .................. 74/475, 502.2, 74/500.5, 483, 489, 501.5 R, 422, DIG. 7, DIG. 20

[56] References Cited

U.S. PATENT DOCUMENTS

| | | | |
|---|---|---|---|
| 3,633,437 | 1/1972 | Ishida | 74/489 |
| 4,325,267 | 4/1982 | Kojima | 74/489 |
| 4,846,094 | 7/1989 | Woods | 116/303 |
| 4,859,984 | 8/1989 | Romano | 340/432 |
| 5,012,692 | 5/1991 | Nagano | 74/475 |
| 5,178,033 | 1/1993 | Kund | 74/501.5 |
| 5,325,735 | 7/1994 | Nagano | 74/489 |
| 5,458,018 | 10/1995 | Kawakami | 74/502.2 |

FOREIGN PATENT DOCUMENTS

| | | |
|---|---|---|
| 0 552 775 | 7/1993 | European Pat. Off. . |
| 0 589 392 | 3/1994 | European Pat. Off. . |
| 495739 | 8/1954 | Italy .................. 74/489 |

*Primary Examiner*—Vinh T. Luong
*Attorney, Agent, or Firm*—James A. Deland

[57] ABSTRACT

A shifting apparatus for a bicycle includes a takeup element for winding a control cable, a shift lever for engaging and rotating the takeup element, a power takeoff (PTO) mechanism operable with rotation of the takeup element, and a shifter case for rotatably supping the takeup element. The shifter case includes a mounting portion for connecting the shifter case to a handlebar of the bicycle, a coupling section, and a speed indicator mounted on the coupling section. The speed indicator has a movable member operatively connected to the PTO mechanism for indicating a selected speed.

10 Claims, 6 Drawing Sheets

SHIFTING DEVICE FOR A BICYCLE

This application is a continuation of Ser. No. 08/261,374 filed Jun. 16, 1994 now abandoned.

BACKGROUND OF THE INVENTION

1. Field of the Invention

The present invention relates to a shifting device for a bicycle including a takeup element for winding a speed control cable, shift levers for rotating the takeup element, and a shifter case for housing the takeup element and having a mounting portion for connection to a handlebar of the bicycle.

2. Description of the Related Art

Conventional shifting devices for bicycles may be classified into the type having a speed indicator and the type having no speed indicator. The shifting device with a speed indicator includes a shifter case having a relatively large capacity to accommodate movable elements of the speed indicator as well as the takeup element. The shifting device without a speed indicator includes a shifter case having a relatively small capacity to accommodate only a shifting mechanism including the takeup element. Thus, the two types of shifting devices are manufactured by separately preparing components designed specially for the shifting device with the speed indicator, and those designed specially for the shifting device without.

The shifter case for the shifting device without the speed indicator is smaller than the shifter case for the shifting device with the speed indicator, but still is itself a large component of the shifting device. Thus, two types of relatively large dies are required to form separately the shifter case for the shifting device with the speed indicator and the shifter case for the shifting device without the speed indicator. This results in high cost of the shifting devices.

SUMMARY OF THE INVENTION

The present invention intends to provide a shifting device for a bicycle having a relatively inexpensive construction to be usable as the type with a speed indicator and as the type without one.

The above object is fulfilled, according to the present invention, by a shifting device for a bicycle as noted in the outset hereof, which includes, besides the takeup element for winding a control cable, PTO means operable with rotation of the takeup element to control a speed indicator, and a shifter case for rotatably supporting the takeup element, the shifter case including a coupling section for connecting the speed indicator to the shifter case, and a power takeoff opening disposed adjacent the coupling section, wherein the PTO means is accessible through the power takeoff opening.

According to the invention, the speed indicator is manufactured independently of the shifting device, and assembled thereto by connecting the speed indicator to the coupling section so that a torque is transmitted from the takeup element through the power takeoff opening to a movable element of the speed indicator. This construction provides the type of shifting device having the speed indicator with the movable element operable in response to a shifting operation to indicate a selected speed stage. When the coupling section is closed with a lid instead of connecting the speed indicator thereto, the shifting device acts as the type having no speed indicator.

Thus, the shifting device having a main body of fixed construction may be used as the type having a speed indicator and the type having no speed indicator, with the speed indicator manufactured as a supplemental module to be assembled to the shifting device. The shifter case forming part of the shifting device itself may have a relatively small size for accommodating only a shifting mechanism including the takeup element. The speed indicator may have an indicator case which is also a relatively small size. This shifting device may be manufactured at a relatively low cost while being usable as the type having a speed indicator or the type having no speed indicator.

Further and other objects, features and effects of the invention will become more apparent from the following more detailed description of an embodiment of the invention taken with reference to the accompanying drawings.

DETAILED DESCRIPTION OF THE PREFERRED EMBODIMENT

Figure 1:
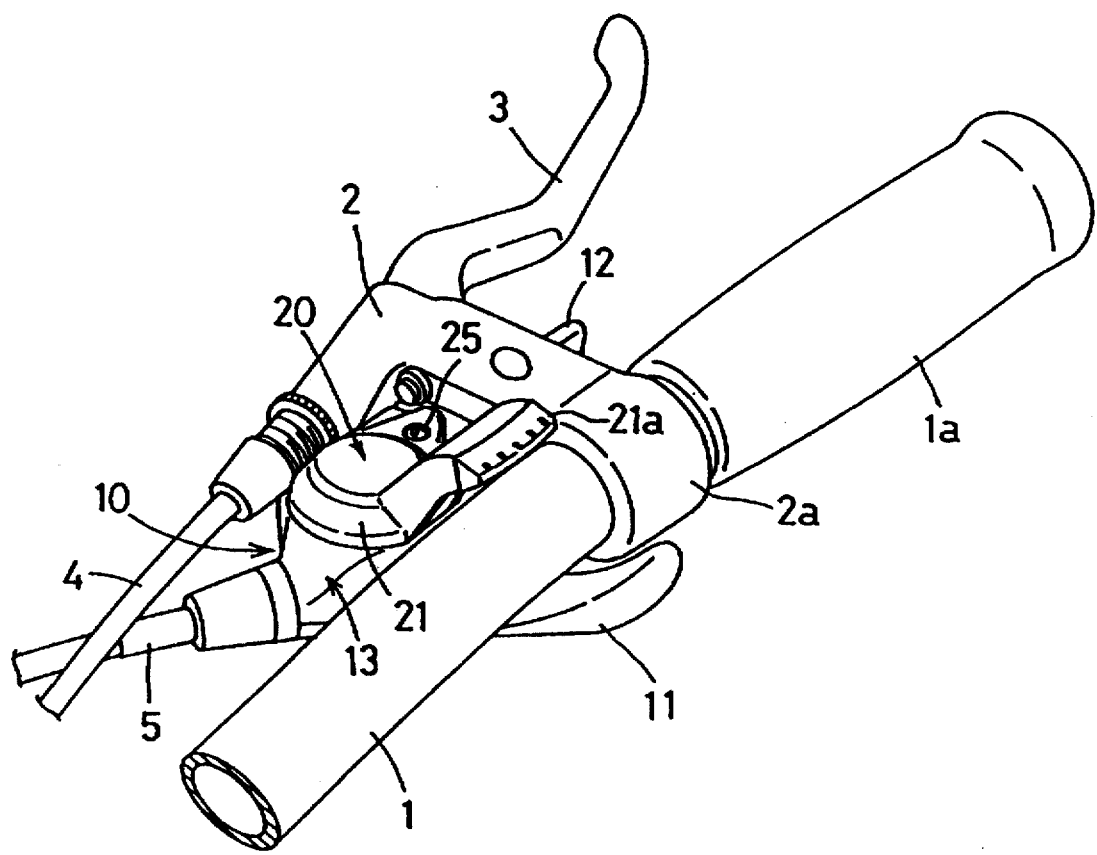
FIG. 1 is a perspective view of a brake lever apparatus including a shifting device with a speed indicator according to the present invention.
Figure 2:
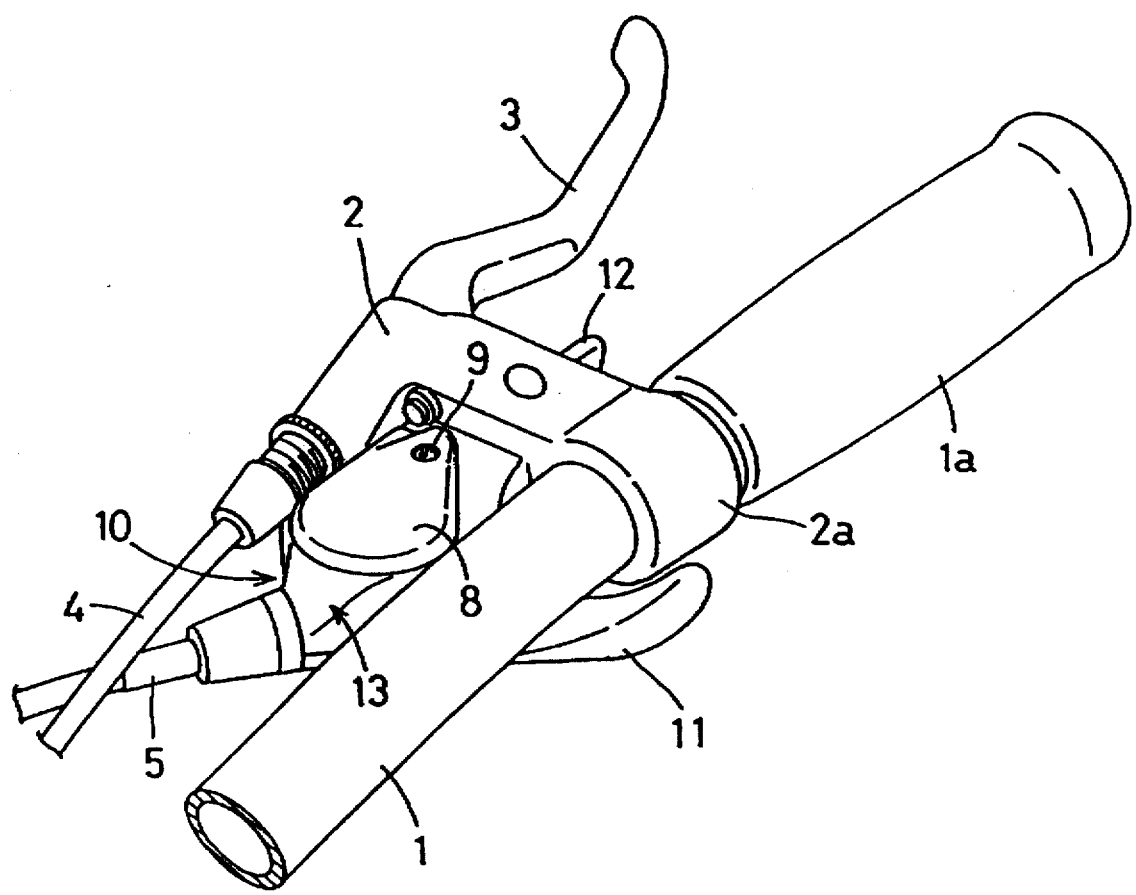
FIG. 2 is a perspective view of the brake lever apparatus including the shifting device without the speed indicator according to the present invention.
Figure 3:
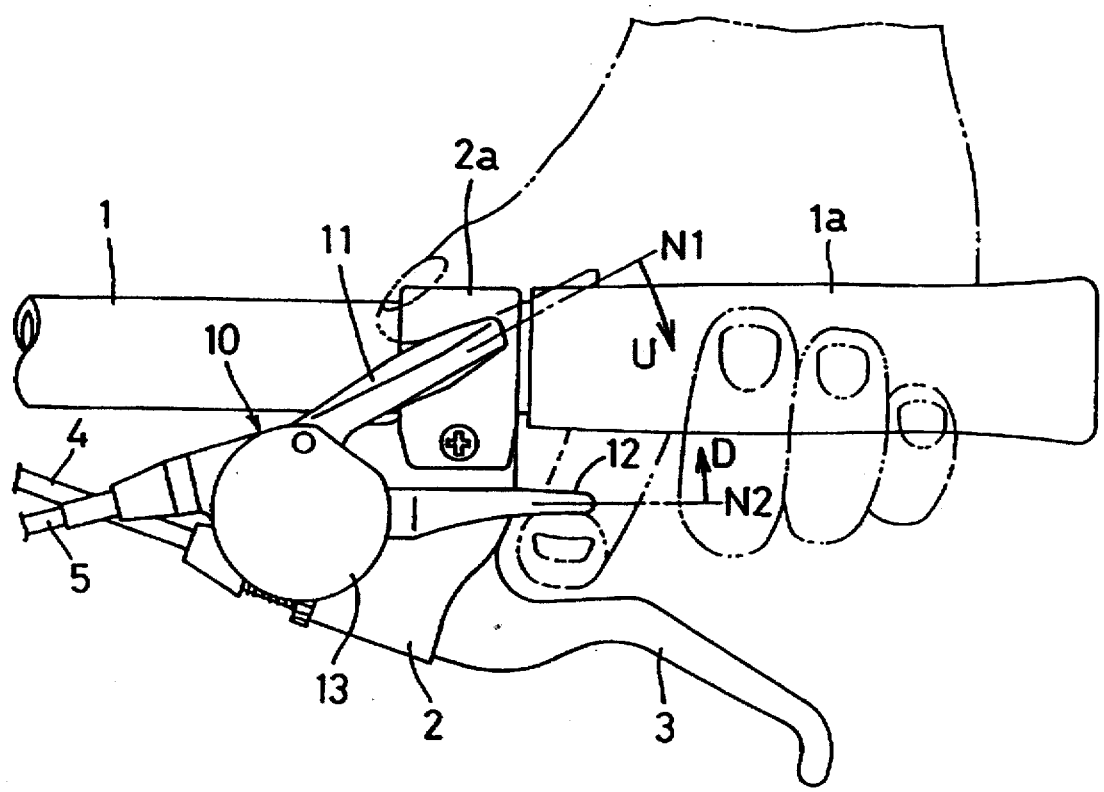
FIG. 3 is a bottom view of the brake lever apparatus including the shifting device.

FIGS. 1 through 3 show a brake lever apparatus having a shifting device for a bicycle. A bicycle handlebar 1 supports a lever bracket 2 fixed tight thereto through a mounting portion 2a thereof. The lever bracket 2 pivotably supports a brake lever 3. The lever bracket 2 also supports a shifting device 10 including a shifter case 13 and a pair of shift levers 11 and 12. A front (or rear) brake cable 4 is connected to the brake lever 3, while a front (or rear) wheel speed control cable 5 is connected to the shifting device 10.

Figure 4:
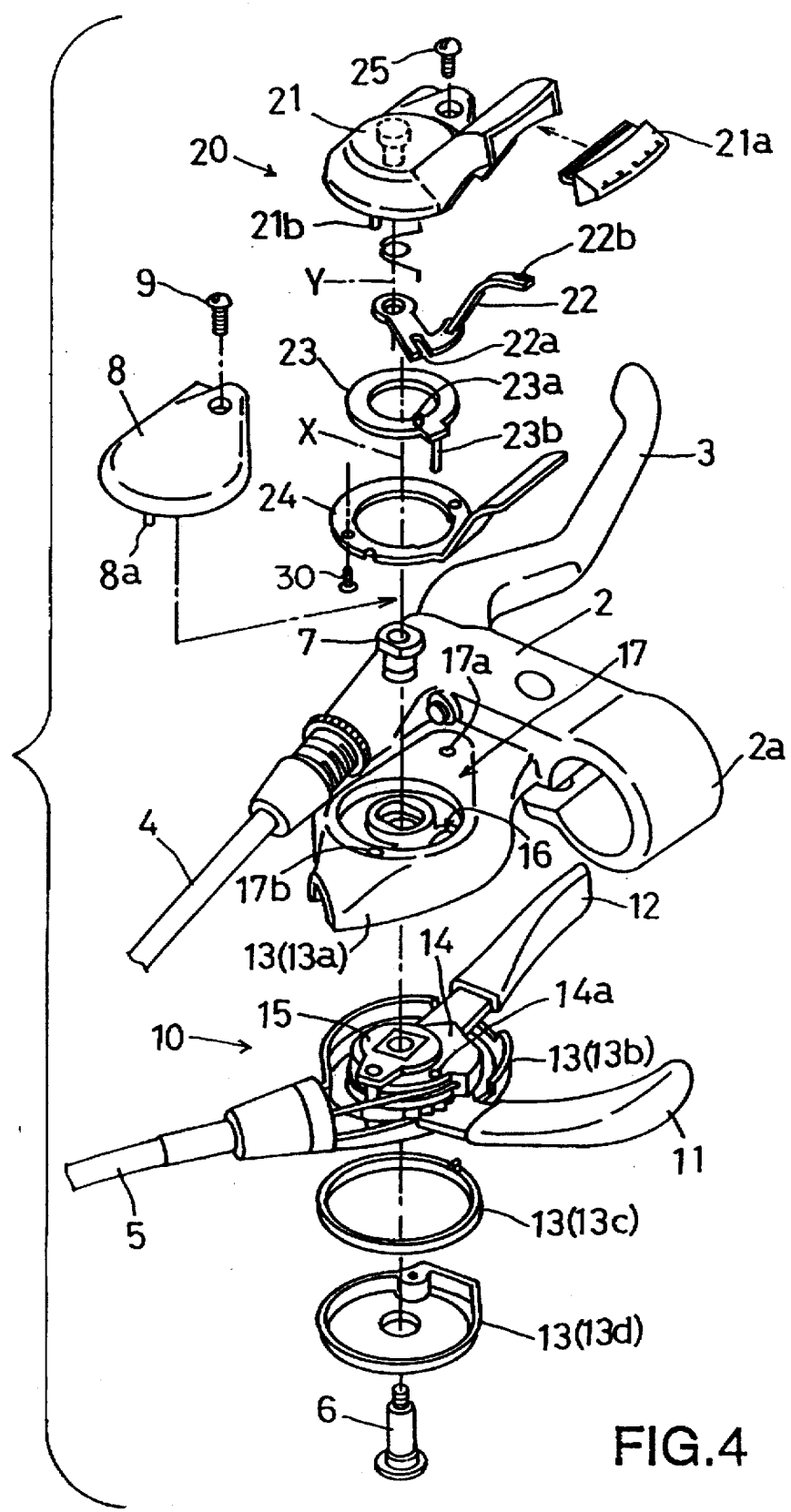
FIG. 4 is an exploded perspective view of the shifting device including the speed indicator.

The shifting device 10 includes a takeup element 14 as well as the shifter case 13 and the pair of shift levers 11 and 12. FIG. 4 shows details of the shifting device 10.

The shifter case 13 is formed of four case portions, i.e. an upper case portion 13a, a first lower case portion 13b, a second lower case portion 13c and a third lower case portion 13d. The lower case portions 13b–13d are fastened to the upper case portion 13a by a bolt 6 extending through the shifter case 13 and a nut 7 attached to an upper position of the shifter case 13. The upper case portion 13a is formed integral with the lever bracket 2. With the lower case portions 13b–13d connected to the upper case portion 13a, the entire shifter case 13 is connected to the handlebar 1 through the mounting portion 2a of the lever bracket 2. The shift levers 11 and 12 and takeup element 14 are attached to a support member 15 to form a shifter unit. The shifter unit is mounted in the shifter case 13 and connected thereto by the bolt 6 and nut 7.

The shift levers 11 and 12 are interlocked to the takeup element 14 through a known ratchet type interlock mechanism. This interlock mechanism includes a ratchet type feed pawl (not shown) for transmitting a pivotal movement of the shift lever 11 to the takeup element 14, a positioning pawl (not shown) for retaining the takeup element 14 in a predetermined rotational position, a limiter pawl (not shown) for limiting an unwinding rotation of the takeup element 14, and a release cam (not shown) for disengaging the positioning pawl from the takeup element 14. By operating the shift levers 11 and 12, the takeup element 14 is rotatable to pull or relax an inner wire of the control cable 5. For example, when the shift lever 11 is shifted in "U" direction from an original position N1 as shown in FIG. 3, the takeup element 14 rotates in a winding direction to take up the inner wire of the control cable 5. The shift lever 11 may be released after being operated a predetermined amount necessary for effecting a change of speed. Then, the shift lever 11 automatically returns to the original position N1 under the biasing force of a return spring (not shown). At this time, despite the return to the original position N1 of the shift lever 11, the takeup element 14 is retained in a position to which the takeup element 14 has been rotated by the shift lever 11, to complete the change of speed. The shift lever 12 is shiftable in "D" direction from an original position N2. Thereafter, the shift lever 12 may be released to return to the original position N2 by the biasing force of a return spring (not shown). Then, the takeup element 14 rotates by an angle of one pitch in the unwinding direction under the force of an unwind spring (not shown) and a restoring force of the shifting device provided by the inner wire. Consequently, the shifting device unwinds the inner wire of the control cable 5 to effect a one-stage change speed.

Figure 5:
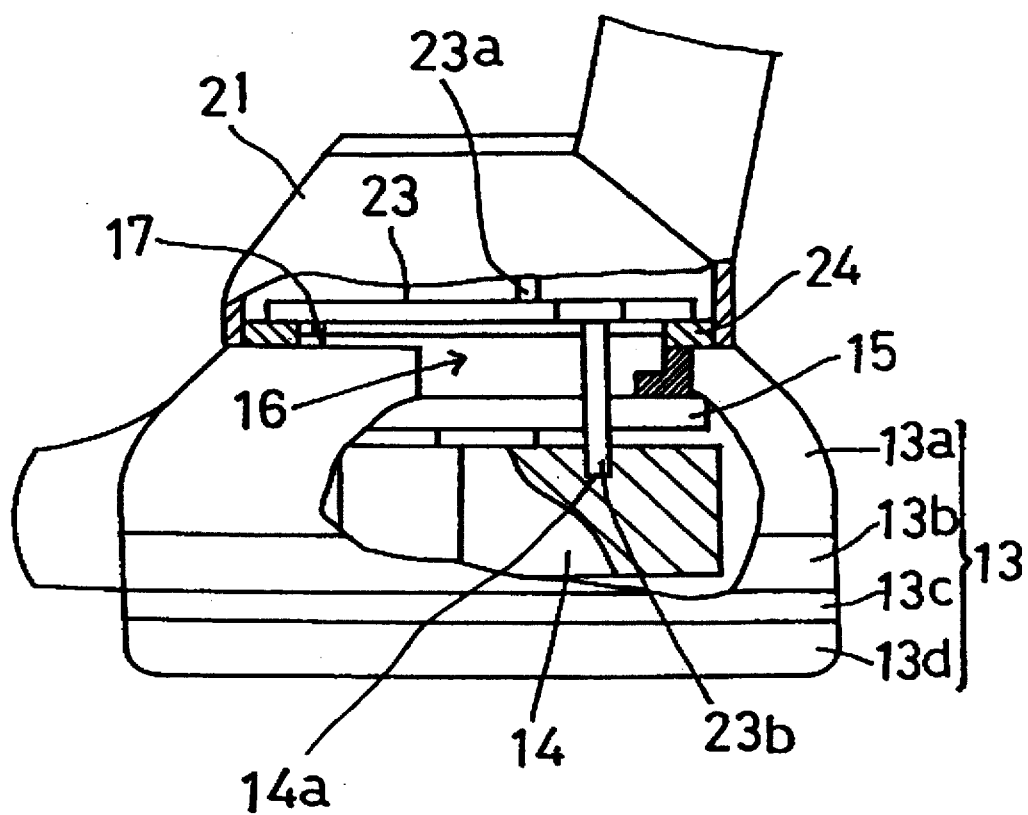
FIG. 5 is a partial cutaway view illustrating a power takeoff portion of the shifting device.

As shown in FIGS. 4 and 5, a power takeoff opening 16 is defined in an upper surface of the upper case portion 13a. As shown in FIG. 2, the power takeoff opening 16 is closed with a lid 8 formed separately from the shifter case 13 and attachable to the upper case portion 13a. A speed indicator 20 also shown in FIG. 4 may be attached to the power takeoff opening 16 in place of the lid 8. Then, the shifting device acts as the type having the speed indicator as shown in FIG. 1.

The lid 8 is connected to a coupling section 17 in the form of an annular flat surface defined on the upper surface of the upper case portion 13a as shown in FIGS. 4 and 5. Specifically, the lid 8 is placed on the coupling section 17, and fastened with a mounting screw 9 extending through the lid 8 and meshed with a threaded bore 17a defined in the coupling section 17. Further, the lid 8 is held against rotation by a rotation stopper projection 8a formed on the lid 8 and extending into a retainer bore 17b formed in the coupling section 17.

The speed indicator 20 may be attached to the coupling section 17 in place of the lid 8. With the lid 8 removed, the power takeoff opening 16 is exposed on the upper surface of the shifter case 13 adjacent the coupling section 17 for allowing the speed indicator 20 to be operatively connected thereto.

As shown in FIG. 4, the speed indicator 20 includes an indicator case 21, indicating means including a pointer 22 and a power takeoff (PTO) element 23, and a support 24. The speed indicator 20 is connectable to the coupling section 17 of the shifter case 13 to be driven by rotation of the takeup element 14.

Figure 6:
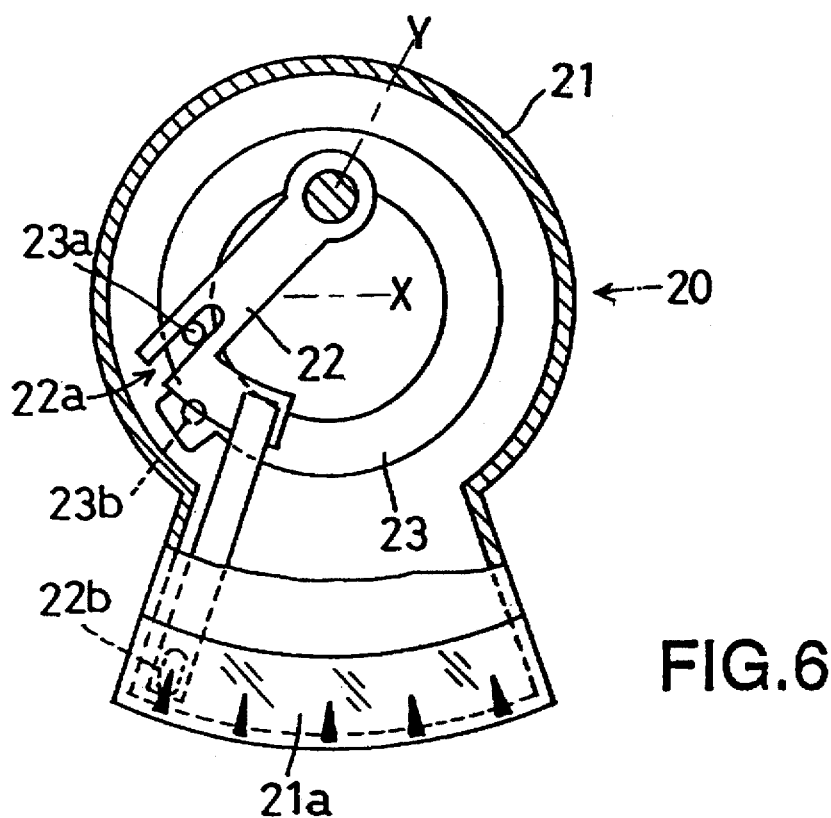
FIG. 6 is a partial cutaway view of the speed indicator according to the present invention.
Figure 7:
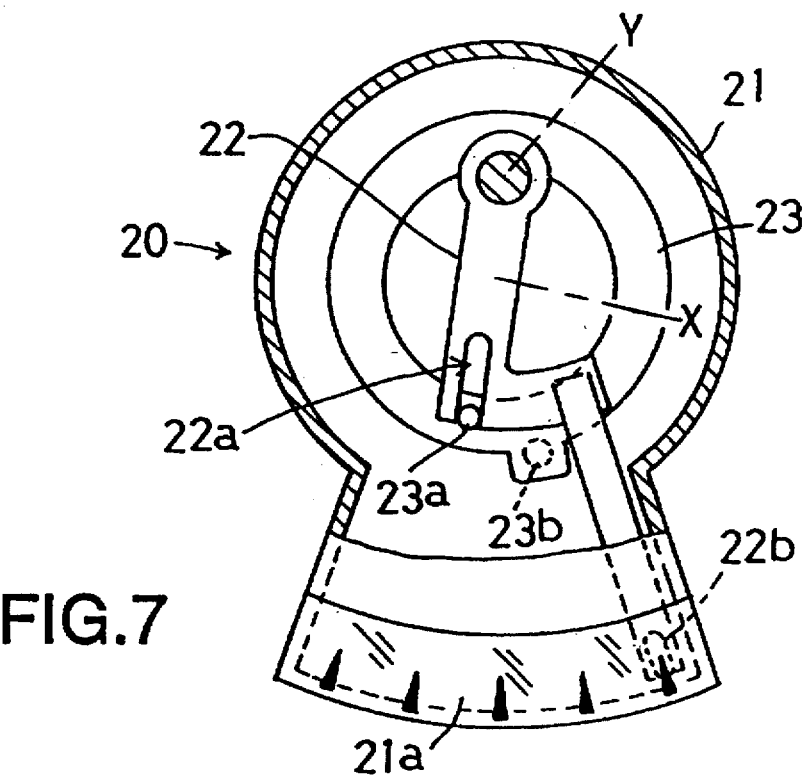
FIG. 7 is a view similar to FIG. 6 and showing the speed indicator in a position to indicate a different speed stage.

The pointer 22 is attached to a pivot pin inside the indicator case 21 to be pivotable about a first axis Y. The support 24 is fixed to a bottom of the indicator case 21 by fixing means in the form of screws and rotatably supports the power takeoff element 23. Consequently, the power takeoff element 23 is supported to be rotatably about a second axis X relative to the indicator case 21. As shown in FIGS. 6 and 7, the pointer 22 and power takeoff element 23 are interlocked through a projection 23a of the power takeoff element 23 extending into and slidable along a slot 22a formed in the pointer 22. When the power takeoff element 23 is rotated about the axis X relative to the indicator case 21, the pointer 22 pivots about the axis Y relative to the indicator case 21. Then, a distal end 22b of the pointer 22 moves along a scale panel 21a of the indicator case 21 from the position shown in FIG. 6 to the position shown in FIG. 7 to indicate a speed mark provided on the scale panel 21a.

The speed indicator 20 is connected to the coupling section 17 by placing the portion of the speed indicator 20 having the support 24 on the coupling section 17, turning a mounting screw 25 extending through the indicator case 21 into the threaded bore 17a, and fitting a rotation stopper projection 21b of the indicator case 21 into the retainer bore 17b. When connecting the speed indicator 20 to the coupling section 17, as shown in FIG. 5, a power takeoff projection 23b of the power takeoff element 23 is positionally adjusted to the power takeoff opening 16 and takeup element 14, so that a tip end of the power takeoff projection 23b extends through the power takeoff opening 16 into the shifter case 13 to be fitted in a connecting hole 14a formed in the takeup element 14. Thus, when the speed indicator 20 is connected to the coupling section 17) the power takeoff element 23 is interlocked to the takeup element 14 through the engagement between the power takeoff projection 23b and connecting hole 14a. As a result, the axis X of rotation of the power takeoff element 23 is aligned to the axis of rotation of the takeup element 14, whereby the power takeoff element 23 is rotatable with the takeup element 14. The power takeoff element 23 receives a torque from the takeup element 14 through the power takeoff opening 14, and transmits this torque to the pointer 22 through the projection 23a. That is, when a shifting operation is effected through the shift lever 11 or 12, the takeup element 14 is rotated to rotate the power takeoff element 23. The rotation of the power takeoff element 23 provides a force to drive the pointer 22. The speed indicator 20 shows a selected speed stage, with the distal end 22b of the pointer 22 indicating at a corresponding speed mark.

As shown in FIG. 1, the speed indicator 20 and scale panel 21a are arranged relative to the mounting portion 2a of the lever bracket 2 when the mounting portion 2a is connected to the handlebar 1, such that the shift levers 11 and 12 are disposed below the handlebar 1, and that the scale panel 21a is disposed above the handlebar 1 and extends along the handlebar 1 adjacent where the speed indicator 20 is connected. Thus, the shift levers 11 and 12 are within easy reach of the thumb and a finger of the rider's hand holding a grip 1a of the handlebar 1. The scale panel 21a is visible clear of the handlebar 1 to allow the rider to confirm a selected speed stage accurately. Further, the speed indicator 20 has a compact overall size to place the scale panel 21a dose to the handlebar 1. Instead of being disposed above the handlebar 1, the scale panel 21a may be disposed below and extend along the handlebar 1.

In the above embodiment, the shifting device is assembled to the brake lever apparatus to be attached to the handlebar along with the brake lever. The present invention is applicable to a shifting device attachable to the handlebar independently of the brake lever apparatus. Thus, the mounting portion 2a of the lever bracket 2 may be regarded as a mounting portion 2a of the shifter case 13.

According to the present invention, the shift levers may be directly connected to the takeup element instead of being operatively connected thereto through the ratchet type interlock mechanism.

In the foregoing embodiment, the speed indicator includes the fixed scale panel having the speed marks, and the movable pointer. Alternatively, the pointer may be fixed and the scale panel having the speed marks adapted movable. The pointer 22 is called herein a movable element 22 also.

What is claimed is:

1. A shifting apparatus comprising
 a takeup element;
 a shift lever for engaging and rotating said takeup element;
 power takeoff means operable with rotation of said takeup element;
 a speed indicator including:
  a speed indicator case;
  a support; and
  indicating means disposed between said support and said indicator case and supported to said support to rotate about a first axis, said indicating means being connected to said power takeoff means for moving relative to said support in response to a rotation of said takeup element;
 a shifter case for rotatably supporting said takeup element, said shifter case having a coupling section for externally mounting said speed indicator thereon;
 a fastener for fastening said indicator case to said shifter case;
 wherein said speed indicator includes fixing means for fixing said support to said indicator case so that said support remains fixed to said indicator case when said speed indicator is uncoupled from said shifter case;
 wherein said takeup element rotates about a second axis; and
 wherein said first and second axes are parallel to each other.

2. A shifting apparatus as defined in claim 1, wherein said indicating means includes:
 a pointer for indicating a selected speed; and
 a power takeoff element for coupling said pointer to said power takeoff means.

3. A shifting apparatus as defined in claim 1, wherein said coupling section is disposed in an upper portion of said shifter case.

4. A shifting apparatus as defined in claim 1, wherein said shift lever is oriented to be mounted below a bicycle handlebar, and wherein said speed indicator includes a scale panel oriented to extend substantially along said handlebar in close proximity thereto.

5. A shifting apparatus as defined in claim 1, wherein said speed indicator includes:
 a scale panel; and
 a pointer moveable along said scale panel.

6. A shifting apparatus as defined in claim 1 wherein said first axis and said second axis coincide.

7. A shifting apparatus comprising
 a takeup element;
 a shift lever for engaging and rotating said takeup element;
 power takeoff means operable with rotation of said takeup element;
 a speed indicator including:
  a speed indicator case;
  a support; and
  indicating means disposed between said support and said indicator case and supported to said support to rotate about a first axis, said indicating means being connected to said power takeoff means for moving relative to said support in response to a rotation of said takeup element;
 a shifter case for rotatably supporting said takeup element, said shifter case having a coupling section for externally mounting said speed indicator thereon;
 a fastener for fastening said indicator case to said shifter case;
 wherein said speed indicator includes fixing means for fixing said support to said indicator case so that said support remains fixed to said indicator case when said speed indicator is uncoupled from said shifter case; and
 wherein said indicating means has a rod-shaped projection projecting toward said shifter case and engaging with said power takeoff means.

8. A shifting apparatus as defined in claim 7 wherein said takeup element defines a connecting hole for engaging with said rod-shaped projection of said indicating means.

9. A shifting apparatus comprising
 a takeup element;
 a shift lever for engaging and rotating said takeup element;
 power takeoff means operable with rotation of said takeup element;
 a speed indicator including:
  a speed indicator case;
  a support; and
  indicating means disposed between said support and said indicator case and supported to said support to rotate about a first axis, said indicating means being connected to said power takeoff means for moving relative to said support in response to a rotation of said takeup element;
 a shifter case for rotatably supporting said takeup element, said shifter case having a coupling section for externally mounting said speed indicator thereon;
 a fastener for fastening said indicator case to said shifter case;
 wherein said takeup element rotates about a second axis; and
 wherein said first and second axes are parallel to each other.

10. A shifting apparatus comprising
 a takeup element;
 a shift lever for engaging and rotating said takeup element;
 power takeoff means operable with rotation of said takeup element;
 a speed indicator including:
  a speed indicator case;
  a support; and
  indicating means disposed between said support and said indicator case and supported to said support to rotate about a first axis, said indicating means being connected to said power takeoff means for moving relative to said support in response to a rotation of said takeup element;
 a shifter case for rotatably supporting said takeup element, said shifter case having a coupling section for externally mounting said speed indicator thereon;
 a fastener for fastening said indicator case to said shifter case; and
 wherein said indicating means has a rod-shaped projection projecting toward said shifter case and engaging with said power takeoff means.

* * * * *